United States Patent [19]

Lochmann et al.

[11] 4,209,284
[45] Jun. 24, 1980

[54] ELECTRIC MOTOR-DRIVEN TWO-STAGE FUEL PUMP

[75] Inventors: Robert L. Lochmann; Bryce L. Stevens, both of Grand Blanc, Mich.

[73] Assignee: General Motors Corporation, Detroit, Mich.

[21] Appl. No.: 938,947

[22] Filed: Sep. 1, 1978

[51] Int. Cl.² .................. F04B 17/00; F04B 35/00; H02K 21/26
[52] U.S. Cl. ............................ 417/366; 310/154; 415/198.2
[58] Field of Search ............ 417/366, 423 R, 424, 417/244; 310/154; 415/198.2

[56] References Cited

U.S. PATENT DOCUMENTS

| 2,282,569 | 5/1942 | Fabig | 415/198.2 X |
| 3,418,991 | 12/1968 | Shultz et al. | 417/423 R |
| 3,631,277 | 12/1971 | Ferdig et al. | 310/154 |
| 3,978,354 | 8/1976 | Lee et al. | 310/154 X |

*Primary Examiner*—Richard E. Gluck
*Attorney, Agent, or Firm*—Donald F. Scherer

[57] ABSTRACT

A fuel system for a motor vehicle wherein an electric motor-driven two-stage fuel pump has a motor with a cylindrical flux carrier having a pair of segmented permanent magnets disposed therein in a manner to provide a pair of axial fuel flow paths intermediate said magnets and interior to the flux carrier. The motor armature has a drive shaft with a D-shaped section which supports a pair of pump impellers each having a central D-shaped aperture complementary to the D-shaped section of the drive shaft. The shaft has a single bearing intermediate the armature and impellers so that the impellers are supported by the D-shaped drive connection in a manner which permits axial alignment of the impellers relative to the stationary elements of the pump.

1 Claim, 6 Drawing Figures

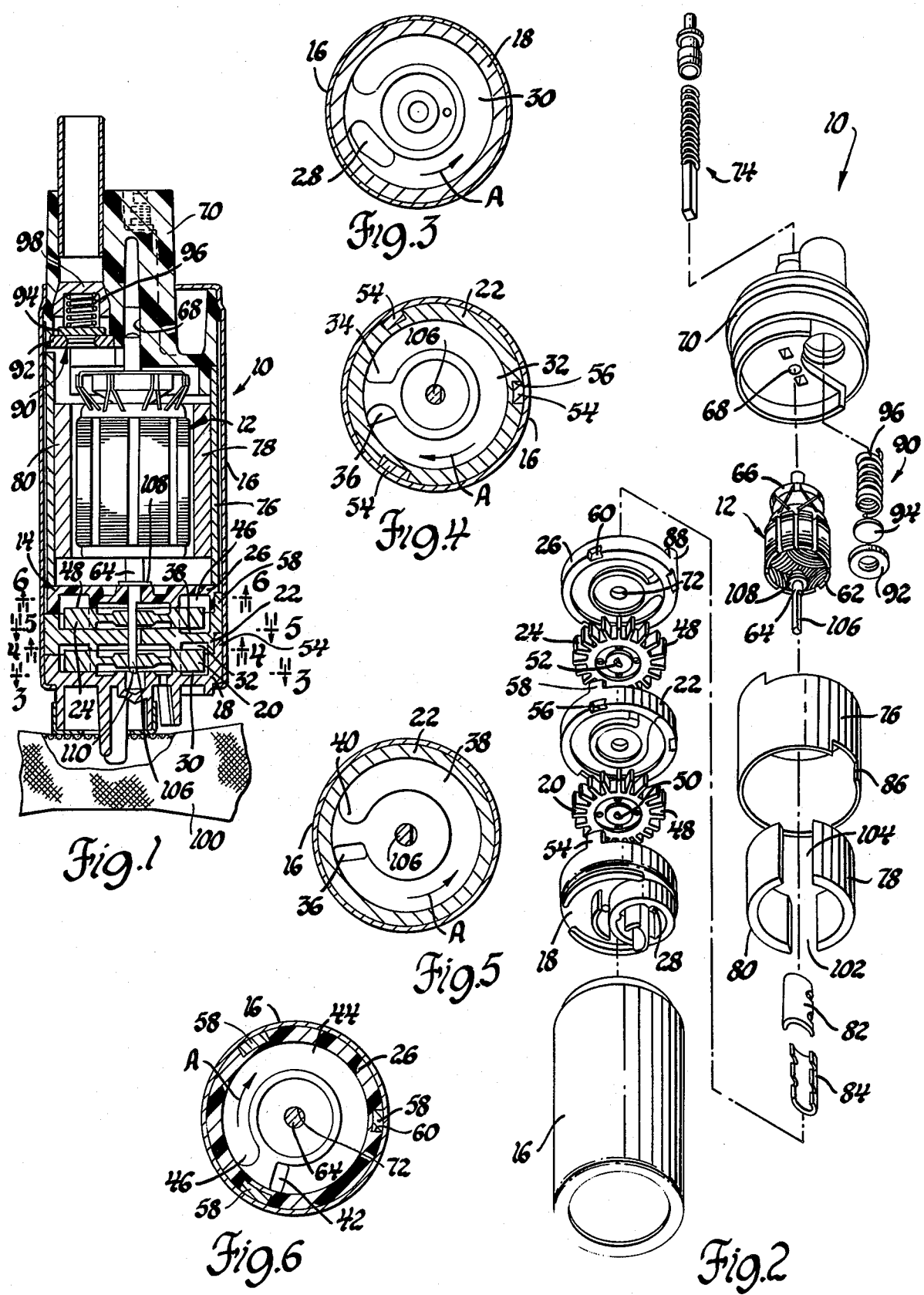

ELECTRIC MOTOR-DRIVEN TWO-STAGE FUEL PUMP

This invention relates to two-stage fuel pumps and more particularly to electric motor-driven fuel pumps wherein a fuel flow path is integral with the motor structure.

Prior art fuel pumps, such as U.S. Pat. No. 3,676,025 to Shultz et al issued July 11, 1972, describe various types of motors having integral flow paths. In Shultz et al, a fuel pump is disclosed wherein a large air gap clearance is provided between the armature and the cylindrical magnet to provide a flow path through the fuel pump. As pointed out in this patent, the large air gap reduces the efficiency of the electric motor but does improve the flow efficiency of the pump.

The present invention utilizes a pair of segmented magnets which are separated by spring clips. The magnets surround the armature with a conventional air gap, however, a pair of channels formed by the sidewalls of the segmented magnets provide openings for fuel flow through the motor. This permits the electric motor to operate at normal efficiency and also provides open flow paths which improve the flow efficiency of the pump.

The present invention also provides for a drive arrangement between the electric motor and the fuel pump such that the impellers of the fuel pump are permitted to align axially with the stationary housing members and passages within the fuel pump itself. This is obtained through the use of a single bearing support on the impeller end of the motor drive shaft which is disposed between the motor armature and the pump. Thus, the impellers are essentially supported in cantilever fashion on the drive shaft.

It is an object of the invention to provide an improved electric motor-driven two-stage fuel pump having fuel flow passages defined on three sides by the motor flux housing and a pair of segmented motor magnets.

It is another object of this invention to provide an improved electric motor-driven two-stage fuel pump with a pump portion having two impellers driven by the motor shaft and supported thereon for freedom in the axial direction and a motor portion having a pair of segmented magnets wherein a pair of fuel flow paths are defined in part by the spaces between the segmented magnets.

These and other objects and advantages of the present invention will be more apparent from the following description and drawings in which:

FIG. 1 is a cross sectional view of a pump and motor incorporating the present invention;

FIG. 2 is an exploded view of the pump and motor shown in FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1; and

FIG. 6 is a sectional view taken along line 6—6 of FIG. 1.

Referring to the drawings, wherein like characters represent the same or corresponding parts throughout the several views, there is seen an electric motor-driven fuel pump, generally designated 10, having an electric motor 12 and a two-stage fuel pump 14. The motor 12 and pump 14 are enclosed in a single cylindrical housing 16. The pump 14 includes an inlet section 18, a first stage impeller 20, an intermediate stationary section 22, a second stage impeller 24 and an outlet section 26. The inlet section 18 has an inlet opening 28 which is connected to an annular groove 30 which is adjacent the lower side of impeller 20, when viewed in FIGS. 1 and 2. The upper side of impeller 20 is adjacent an annular recess 32 formed in intermediate section 22. The annular portion 32 has a closed end 34 which is aligned with opening 28 and an outlet opening 36 which communicates angularly through the intermediate section 22 to another annular recess 38 which is disposed adjacent the lower end of impeller 24. The annular section 38 has a substantially closed end 40 which is aligned with an outlet port 42 formed in outlet section 26. The outlet port 42 is in communication with an annular recess 44 which has a closed end 46 substantially adjacent the opening 36 in the intermediate section 22.

The impellers 20 and 24 are substantially identical in design and include a plurality of random spaced vanes 48 as disclosed in U.S. Pat. No. 3,418,991 to Shultz et al, issued Dec. 31, 1968. The impellers 20 and 24 have central D-shaped apertures 50 and 52, respectively. The impeller 20 is substantially enclosed between the inlet section 18 and intermediate section 22; while the impeller 24 is substantially enclosed between the intermediate section 22 and outlet section 26. To maintain the sections properly aligned, the inlet section 18 has a tab 54 which fits in a slot 56 formed in section 22, which in turn has a tab 58 which fits in a slot 60 formed in outlet section 26. This arrangement maintains the proper axial alignment between the stationary pump sections such that the fluid flow through the pump is from inlet 28 through port 36 and outlet 42. The Arrow A in each of the FIGS. 3 through 6, represents the direction of rotation of the impeller relative to the stationary portion when viewed in the direction indicated.

The electric motor 12 includes an armature 62 having a drive shaft 64 and a commutator 66 integral therewith. The drive shaft 64 is rotatably supported in an opening 68 in a pump outlet 70 and in an opening 72 formed in outlet section 26. Pump outlet 70 and outlet section 26 are preferably made from a glass reinforced thermoplastic polyester to eliminate the need for a bearing in openings 68 and 72. The commutator 66 is contacted by a pair of spring-loaded brushes such as that shown at 74 which are in turn connected to a source of electrical power in a conventional manner. The motor also includes a cylindrical flux ring 76 in which is disposed a pair of annular segmented magnets 78 and 80 which are held in their separated condition during assembly, prior to being magnetized, by a pair of spring clips 82 and 84. The flux ring 76 has an axial recess 86 which engages a tab 88 formed on outlet section 26. The flux ring 76 is supported on the pump outlet 70.

The pump outlet 70 has disposed therein a one-way valve 90 which includes a valve seat 92, a valve seal member 94 and a coil spring 96. As best seen in FIG. 1, the valve seat 92 is pressed into the pump outlet 70 and the spring 96 is compressed between the seal member 94 and a reduced section 98 also pressed into the pump outlet 70. From the pump outlet 70, fuel is distributed to a vehicle engine, not shown, in a conventional manner. Fuel inflow to inlet passage 28 is through a filtering screen 100 which prevents foreign matter from entering the engine fuel system.

The segmented magnets 78 and 80 have radial end walls which are spaced so as to form fluid passages 102 and 104, one of which is preferably disposed in axial alignment with outlet port 42 of section 26 and the other, of course, is diametrically opposite thereto. In this manner, the magnets 78 and 80 can be maintained in sufficient proximity to armature 62 such that a conventional air gap is maintained therebetween which, of course, maintains high efficiency in the electric motor. The passages 102 and 104 being substantially axial with the pump outlet flow, provide unrestricted fluid passage through the motor section to the pump outlet 70. The valve assembly 90 is provided so that during pump shut-down, the fuel in the passages between the pump and the vehicle engine cannot be returned through the pump to the fuel tank. The pump is preferably aligned in a substantially vertical position within the fuel tank.

The drive shaft 64 has a D-shaped section 106 which passes through the D-shaped apertures 50 and 52. The impellers 20 and 24 are loosely mounted on the shaft 64 such that axial movement is permitted so that the impeller sections will be aligned with the stationary pump sections 18, 22 and 26. The impellers, as they rotate, of course, create a centrifugal pressure head which causes the fuel flow through the pump as previously described. However, there is also a pressure unbalance across the impellers. This pressure unbalance is supported in cantilever fashion on the shaft 106 by the opening 72. The axial thrust forces which might occur on the motor shaft 64, are supported by a thrust bearing 108 disposed on the shaft 64 in abutting relation with the stationary section 26. The end 110 of shaft 64 is unsupported to permit the slight alignment necessary between the impellers and stationary sections of the fluid pump. If the end 110 were rigidly supported, the manufacturing tolerances of the impellers and stationary sections would have to be held much tighter thereby increasing the cost of the pump. By permitting the impellers to be substantially free-floating on the drive shaft 64, the tolerance requirements can be substantially reduced.

Obviously, many modifications and variations of the present invention are possible in light of the above teaching. It is therefore to be understood that within the scope of the appended claims, the invention may be practiced otherwise than as specifically described.

The embodiments of the invention in which an exclusive property or privilege is claimed are defined as follows:

1. An electric motor-driven fuel pump for a fuel system for a motor vehicle comprising; an electric motor having a cylindrical flux carrier, a pair of segmented permanent magnets disposed in said flux carrier, a pair of spring clip means for separating said magnets to provide a pair of axial flow paths intermediate said magnets and interior to said flux carrier, and an armature assembly disposed within said magnets and having a drive shaft extending from the ends thereof, said drive shaft having a D-shaped section on one end; a fuel pump having an outlet section having a portion engaging said flux carrier, an intermediate section, means on said outlet and intermediate sections for relative positioning thereof, an inlet section, means on said intermediate and inlet sections for relative positioning thereof, first impeller means driven by said drive shaft and being disposed between said inlet and intermediate sections and having a central D-shaped aperture therethrough complementary to and circumjacent said D-shaped section of said drive shaft, second impeller means driven by said drive shaft and being disposed between said intermediate and outlet sections and having a central D-shaped aperture therethrough complementary to and circumjacent said D-shaped section of said drive shaft, and axial passage means in said inlet, intermediate and outlet sections for respectively admitting fuel to said first impeller means, for transferring fuel from said first impeller means to said second impeller means, and for delivering fuel from said outlet section to said axial flow paths intermediate said magnets; a fuel outlet housing means disposed partially in said flux carrier including bearing means for rotatably supporting one end of said drive shaft, and having fluid passage means in communication with said axial flow paths intermediate said magnets; fuel pump housing means secured to said inlet section and said fuel outlet housing means and enclosing said flux carrier, outlet section, intermediate section and said first and second impellers; and bearing means on said outlet section for providing the only rotational support for the end of said drive shaft adjacent said D-shaped section, said D-shaped section of said drive shaft passing unsupported through said intermediate section.

* * * * *